US010565598B2

(12) United States Patent
Hegeman et al.

(10) Patent No.: US 10,565,598 B2
(45) Date of Patent: Feb. 18, 2020

(54) SPONSORED ADVERTISEMENT RANKING AND PRICING IN A SOCIAL NETWORKING SYSTEM

(75) Inventors: John Hegeman, Palo Alto, CA (US); Hong Ge, Cupertino, CA (US); Maxim Gubin, Walnut Creek, CA (US); Alon Amit, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 664 days.

(21) Appl. No.: 13/545,266

(22) Filed: Jul. 10, 2012

(65) Prior Publication Data
US 2014/0019261 A1 Jan. 16, 2014

(51) Int. Cl.
*G06Q 30/02* (2012.01)
*G06Q 50/00* (2012.01)

(52) U.S. Cl.
CPC ......... *G06Q 30/02* (2013.01); *G06Q 30/0241* (2013.01); *G06Q 50/01* (2013.01)

(58) Field of Classification Search
CPC ..... G06Q 30/02; G06Q 30/0241; G06Q 50/01
USPC .......................................... 705/14.41, 14.53
See application file for complete search history.

(56) References Cited

U.S. PATENT DOCUMENTS

| 2007/0011146 | A1 | 1/2007 | Holbrook |
| 2008/0040235 | A1 | 2/2008 | Avedissian |
| 2008/0184133 | A1 | 7/2008 | Lee et al. |
| 2009/0070219 | A1* | 3/2009 | D'Angelo et al. ............... 705/14 |
| 2010/0293034 | A1 | 11/2010 | Olejniczak et al. |
| 2011/0191167 | A1 | 8/2011 | Agarwal et al. |
| 2011/0231240 | A1* | 9/2011 | Schoen et al. ............. 705/14.41 |

FOREIGN PATENT DOCUMENTS

| JP | 2003-115005 A | 4/2003 |
| JP | 2003256707 A * | 9/2003 |
| JP | 2008-210304 A | 9/2008 |
| JP | 2008-269231 A | 11/2008 |
| JP | 2010-537323 | 12/2010 |
| JP | 2011-222004 A | 11/2011 |

OTHER PUBLICATIONS

Chi Wang, Learning Relevance from Heterogeneous Social Network and its Application in Online Targeting, 2011 (Year: 2011).*

(Continued)

*Primary Examiner* — Tarek Elchanti
(74) *Attorney, Agent, or Firm* — Fenwick & West LLP

(57) ABSTRACT

A social networking system (SNS) provides sponsored stories and organic stories about actions taken by other SNS users to a viewing user. Organic stories are selected based on the likelihood the viewing user is interested in their content. While advertisers compensate the SNS for presentation of sponsored stories, the sponsored stories also include information about actions by other SNS users. To increase the likelihood the viewing user interacts with sponsored stories, a common communication channel is used to present both the sponsored stories and the organic stories. To simplify selection of organic stories and sponsored stories, the SNS determines a common unit of measurement for both and makes selections based on the common unit of measurement.

32 Claims, 7 Drawing Sheets

(56) References Cited

OTHER PUBLICATIONS

Australian Government, IP Australia, Examination report No. 1 for standard patent application, Australian Patent Application No. 2013290273, dated Feb. 6, 2018, three pages.
Canadian Intellectual Property Office, Office Action, Canadian Application No. 2,876,245, dated Dec. 9, 2015, three pages.
Canadian Intellectual Property Office, Office Action, Canadian Application No. 2,876,245, dated Nov. 30, 2016, four pages.
Canadian Intellectual Property Office, Office Action, Canadian Application No. 2,876,245, dated Sep. 20, 2017, five pages.
Japan Patent Office, Office Action, Japanese Patent Application No. 2015-521770, dated Aug. 1, 2017, six pages.
Taiwan Intellectual Property Office, Office Action, Taiwanese Patent Application No. 102124811, dated Jan. 10, 2018, thirty-two pages.
Australian Government, IP Australia, Examination report No. 2 for standard patent application, Australian Patent Application No. 2013290273, dated May 29, 2018, four pages.
PCT International Search Report and Written Opinion, PCT Application No. PCT/US2013/049893, dated Oct. 17, 2013, eleven pages.

* cited by examiner

SPONSORED ADVERTISEMENT RANKING AND PRICING IN A SOCIAL NETWORKING SYSTEM

BACKGROUND

This application relates generally to social networking systems and, in particular, to distributing information about actions taken by other social networking system users based on connections between those users.

Social networks, or social utilities that track and enable connections between users (including people, businesses, and other entities), have become prevalent in recent years. In particular, a social network system allows users to more efficiently communicate information relevant to other users of the social networking system to which they are connected. Typically, social networking systems include a system for maintaining connections among their users and a system for identifying content likely to be relevant to their users. Social networks also collect and maintain information about the users of the social network. This information may be static, such as geographic location, employer, job type, age, music preferences, interests, and a variety of other attributes, or it may be dynamic, such as tracking a user's actions within the social network. The social networking system may notify a user of information about other users connected to the user.

A social networking system may use the connections among its users to identify information most likely to be of interests to different users in view of the users' stated, or inferred, interest in other users to whom they are connected ("connections"). For example, the social networking system may group users according to one or more common attributes in their profiles, such as geographic location, employer, job type, age, music preferences, interests, or other attributes. Social networking system users, or external entities, may use these groups to customize or target information delivery so that different groups receive information likely of interest to them.

Advertisers have attempted to leverage social networking systems' information about users by targeting their advertisements ("ads") to social networking system users whose interests best align with the ads. For example, an advertiser may compensate a social networking system for displaying a banner ad for a concert to its users having an affinity for the performing band in their user profiles. However, these types of ads are devoid of context about other information presented to the user by the social networking website, although the context in which an ad is presented may affect its effectiveness. For example, an ad may be more effective if displayed alongside other non-ad information, while being less effective if displayed alongside other ad information. However, existing social networking do not provide robust mechanisms for controlling the context in which an ad appears on a web page presented by the social networking system.

SUMMARY

A social networking system provides sponsored stories and organic stories to a viewing user to inform the viewing user of actions taken by other social networking system users connected to the viewing user. For example, the social networking system provides the viewing user with a newsfeed including stories relevant to the viewing user. The stories in the newsfeed include both "organic stories" generated based on user actions and selected based on the likelihood the viewing user is interested in their content and "sponsored stories" that are paid to appear by an advertiser, but may also include information of interest to the viewing user. Using a common communication channel to present sponsored stories and organic stories increases the likelihood that the viewing user will view or interact with the sponsored stories, providing revenue to the social networking system from advertisers.

Organic stories include information describing actions taken by users of the social networking system with respect to objects stored in the social networking system. In one embodiment, organic stories include information targeted to a viewing user based on the viewing user's preferences, the viewing user's actions, the viewing user's connection to other users (e.g., friends), and the actions and preferences of those friends. Examples of organic stories include a status update (i.e., the action) by a friend indicating that the friend is currently en route to New York (i.e., the object). To determine which organic stories are included in the newsfeed for the viewing user, the social networking system determines an organic story score indicating an affinity of the viewing user for each organic story describing an action of a social networking user connected to the viewing user. The affinity may be based on factors such as the relevance of the object or action in the organic story to the viewing user.

Sponsored stories are organic stories for which the social networking system receives compensation for presenting to the viewing user. Sponsored stories may also incorporate additional material into an organic story and may have conditions determining when they are presented to a viewing user. For example, a sponsored story notifies the viewing user that a user connected to the viewing user has purchased shoes on ZAPPOS®, will attend an event sponsored by PEPSI™, or has established a connection with the organization Susan G. Komen for the Cure. As with organic stories, various factors may be used to identify sponsored stories for presentation to a viewing user.

However, sponsored stories and organic stories provide different value to the social networking system, with organic stories increasing user interaction with the social networking system and sponsored stories generating revenue for the social networking system. These differing benefits result in conventional techniques using different valuation methods for sponsored stories and organic stories, making it cumbersome to select content for presentation to the viewing user. While the organic story score described above represents the likelihood that the viewing user will interact with the organic story, it does not account for the potential revenue to the social networking system from presentation of a sponsored story. Hence, the social networking system generates a score for sponsored stories. The score is based an affinity score for the sponsored story and a revenue contribution for the sponsored story. The affinity score for a sponsored story may be determined in the same, or a similar, manner as an organic story score. However, the revenue contribution is based on the advertising model used by the social networking system and represents the amount of compensation the social networking system receives from an advertiser for presenting a sponsored story (i.e., the expected value of the sponsored story to the social networking system).

To simplify selection of organic stories and sponsored stories, the social networking system applies a conversion factor to scores of sponsored stories, converting the scores for sponsored stories, which are combinations of affinity score and revenue contribution, to a common unit of measurement as the scores for organic stories. This conversion allows direct comparison of scores for sponsored stories with scores for organic stories, which simplifies selection of sponsored stories and organic stories for inclusion in a newsfeed sent to the viewing user by allowing a single ranking to include sponsored stories and organic stories. In one embodiment, a conversion factor converts the scores into total scores having the same units of measurement as the organic story scores. Alternatively, the conversion factor may be applied to the organic story scores or to both the organic story scores and the sponsored story scores to specify a common unit of measurement for the organic stories and the sponsored stories. This simplifies selection of organic stories and sponsored stories included in a newsfeed, or other distribution channel. Additionally, dynamically adjusting the conversion factor allows the relative mix of organic stories and sponsored stories present in the newsfeed to be easily modified.

For example, the conversion factor may be modified to alter the degree to which the revenue contribution contributes to a total score of a sponsored story. For example, increasing the conversion factor increases the contribution of the revenue contribution and decreasing the conversion factor decreases the contribution of the revenue contribution to a sponsored story's total score. Hence, modifying the conversion factor changes position of sponsored stories in a ranking of sponsored stories and organic stories, allowing the social networking system to regulate the number of sponsored stories presented to the viewing user. This allows the social networking system to both improve user experience and advertising effectiveness by adjusting the amount of advertising material presented to a viewing user at any given time.

The features and advantages described in this summary and the following detailed description are not all-inclusive. Many additional features and advantages will be apparent to one of ordinary skill in the art in view of the drawings, specification, and claims hereof.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
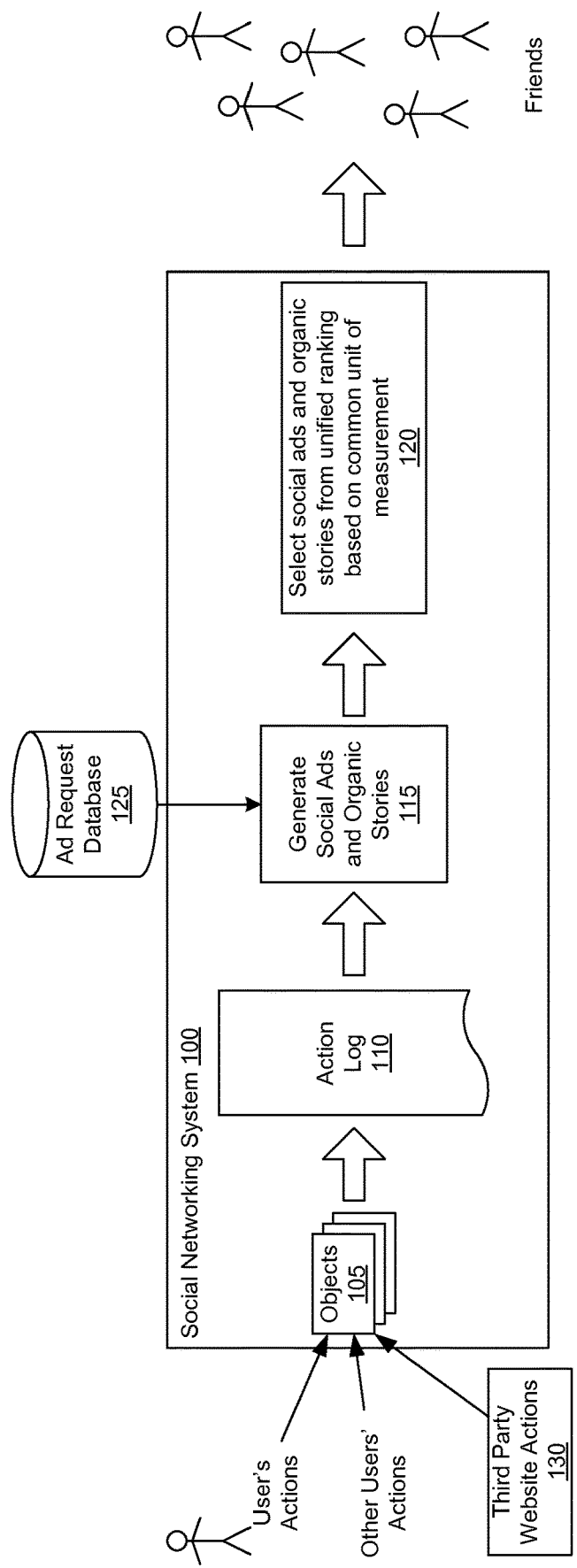
FIG. 1 is an event diagram illustrating creation of newsfeeds based on actions of social networking system users, in accordance with an embodiment of the invention.

Combining Sponsored Stories and Organic Stories for Social Networking System Users FIG. 1 is an event diagram illustrating the creation of newsfeeds including organic stories and sponsored stories based on the actions of the users of a social networking system 100, in accordance with an embodiment of the invention. The social networking system 100 maintains a number of objects 105 with which a user may interact. Examples of objects include user profiles, product pages, event pages, posts, pictures, videos, notes, or any other kind of content. Users may take various actions on one or more objects 105 maintained by the social networking system 100 directly or, indirectly through third party websites 130. Each action by a user is associated with one or more objects 105. When a user takes an action, the action is recorded by the social networking system 100 in an action log 110. For example, if a user changes a picture associated with the user's profile maintained by the social networking system 100, the action may be logged in the action log 110 by storing an identifier associated with the user, an action type defining a picture change, and the picture or a link thereto.

The action log 110 contains a rich set of data about the actions of the users, and can be analyzed and filtered to identify trends and relationships in the actions of the users, as well as identify affinities between the users and various objects. The action log 110 may be queried to identify actions by users that are likely to be of interest to other users. The social networking system 100 uses this information to generate a newsfeed of user actions tailored to different users. The newsfeed includes stories identifying a user, an action taken by the user and an object on which the identified user performed the action. By including stories in which a viewing user is likely to be interested, the social networking system 100 enhances the viewing user's interaction with the social networking system 100. The stories selected for the viewing user's newsfeed includes both "organic stories" generated 115 generated based on user actions as stored in the action log 100 and "sponsored stories" generated 115 from the action log 110 and sponsored by external advertisers, who compensate the social networking system 100 for presenting sponsored stories to users.

An organic story is generated 115 from data in the action log 110 identifying a user, one or more actions performed by the user and one or more objects of the action. The social networking system determines an affinity score of an organic story to a viewing user to indicate the relevance of an organic story to a receiving user, also referred to as an "organic story score." Because the affinity score provides a measure of an organic story's relevance to a viewing user, the social networking system 100 uses organic story scores to select organic stories for inclusion in a viewing user's newsfeed.

While a sponsored story may be generated 115 from data in the action log 110 identifying a user, one or more actions performed by the user and one or more objects of the action, advertisement requests ("ad requests") provided to the social networking system by advertisers and stored in a ad request database 125 are also used to trigger the generation of a sponsored story. Specifically, ad requests may include triggering criteria to identify objects 105 associated with which ad requests. Ad requests may also include targeting criteria for identifying one or more characteristics of users intended to receive a sponsored story based on an ad request. To determine which sponsored stories to send to a user, a score is determined for each sponsored story (a "sponsored story score"), where the score includes an affinity score (or organic contribution) component and a revenue contribution component. As with organic stories, the affinity score represents the likelihood a viewing user has interest in the sponsored story or the relevance of the sponsored story to the viewing user. The revenue contribution represents the compensation received by the social networking system 100 from an advertiser if the sponsored story is presented to a user. The revenue contribution may be determined based on the advertising model used by the social networking system 100.

Generally, sponsored stories and organic stories are interchangeable, and may be presented to a viewing user through the same distribution channels (otherwise referred to as a "common communication channel"). For example, a newsfeed includes a combination of intermixed sponsored stories and organic stories. Because of the revenue contribution component of the sponsored story score, conventional methods involve separate selection of sponsored stories and organic stories. To simplify selection of organic stories and sponsored stories, the social networking system 100 converts the organic story scores and the sponsored story scores to a common unit of measurement, allowing organic stories and sponsored stories to be ranked together. For example, the social networking system 100 generates a total score for each sponsored story based on its affinity score and revenue contribution. In one embodiment, the social networking system 100 generates the total score by applying a conversion factor to social by applying a conversion factor to sponsored story scores to convert the sponsored story scores into total scores having the same unit of measurement as organic scores. Alternatively, a conversion factor may be applied to the organic story scores to convert them to the same unit of measurement as the sponsored story scores or a conversion factor may be applied to both the organic story scores and sponsored story scores to convert them to a common unit of measure.

This allows the social networking system 100 to compare organic stories and sponsored stories using a common unit of measurement. For example, the social networking system 100 generates a unified ranking of organic stories and sponsored stories based on organic story scores and total scores, respectively, and selects 120 organic stories and sponsored stories for presentation to the viewing user. Selecting 120 organic stories and sponsored stories from a unified ranking is further described below.

The conversion factor may be adjusted in a fixed or dynamic manner to accomplish the goals of the social networking system 100. As the conversion factor affects the scores of sponsored stories or organic stories, adjusting the conversion factor modifies the relative amounts of sponsored stories and organic stories presented to a viewing user. For example, if the social networking system 100 seeks to increase revenue, the conversion factor is modified to increase the number of sponsored stories presented. In one embodiment, increasing the conversion factor increases the number of sponsored stories presented. However, to provide more information about social networking system users connected to the viewing user, the conversion factor may be modified to reduce the number of sponsored stories displayed. For example, reducing the conversion factor reduces the number of sponsored stories displayed. Thus, the conversion factor allows the social networking system 100 to easily modify the types of content displayed.

Social Networking System Overview

Figure 2:
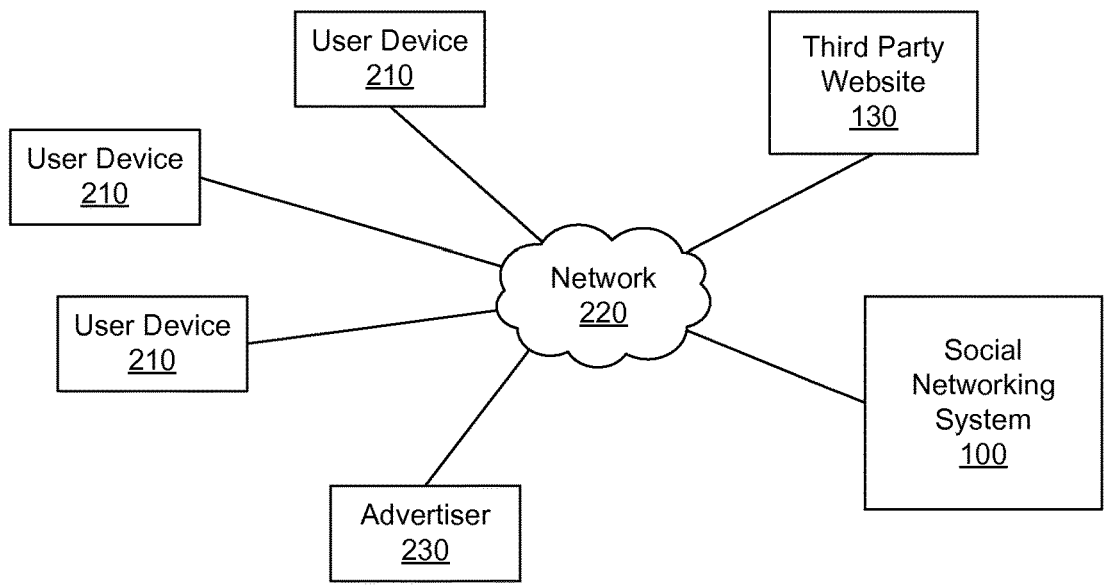
FIG. 2 is a network diagram of a network including a social networking system, in accordance with an embodiment of the invention.

FIG. 2 is a network diagram of one embodiment of a system environment 200 including a social networking system 100. The network includes one or more user devices 210, the social networking system 100, one or more third party websites 130, one or more advertisers 230, and network 220. In alternative configurations, different and/or additional components may be included in the system environment 200.

A user device 210 comprises one or more computing devices capable of receiving user input as well as transmitting and/or receiving data via the network 220. In one embodiment, a user device 210 is a conventional computer system, such as a desktop or laptop computer. In another embodiment, a user device 210 may be a device having computer functionality, such as a personal digital assistant (PDA), mobile telephone, smart-phone or similar device. A user device 210 is configured to communicate via the network 220. In one embodiment, a user device 210 executes an application allowing a user of the user device 210 to interact with the social networking system 240. For example, a user device 210 executes a browser application to enable interaction between the user device 210 and the social networking system 100 via the network 220. In another embodiment, a user device 210 interacts with the social networking system 100 through an application programming interface (API) that runs on the native operating system of the user device 210, such as iOS® or ANDROID™.

The user devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). One or more third party websites 130 and/or advertisers 230 may be coupled to the network 220 for communicating with the social networking system 100

The social networking system 100 comprises one or more computing devices storing a social network, comprising a plurality of users and providing users of the social network with the ability to communicate and interact with other users of the social network. According to various embodiments, the social networking system 100 may comprise a website, or alternatively a server accessible through a wired or wireless network 220 by user devices 210.

In use, users join the social networking system 100 and then add connections (i.e., relationships) to a number of other users of the social networking system 100 to whom they desire to be connected. As used herein, the term "friend" refers to any other user of the social networking system 100 to whom a user has formed a connection, association, or relationship via the social networking system 100. Connections may be added explicitly by a user or may be automatically created by the social networking systems 100 based on common characteristics of the users (e.g., users who are alumni of the same educational institution). For example, a first user specifically selects a particular other user to be a friend. Connections in the social networking system 100 are usually in both directions, but need not be, so the terms "user" and "friend" depend on the frame of reference.

Connections between users of the social networking system 100 are usually bilateral, or "mutual," but connections may also be unilateral, or "one-way." For example, if Bob and Joe are both users of the social networking system 100 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

The social networking system 100 is also capable of linking a variety of entities. For example, the social networking system 100 enables users to interact with each other as well as with objects of content. In one embodiment, the social networking system 100 associates an object with metadata identifying content included in the object. In addition to establishing and maintaining connections between users and enabling interactions between users and objects, the social networking system 100 allows its users to take actions on various types of information stored in the social networking system 100, such as user profiles, objects, events or other suitable information.

Advertisers 230 bid for the presentation of sponsored stories by the social networking system 100. In one embodiment, the social networking system 100 receives advertisement requests ("ad requests") from advertisers including an identification of the content to be presented and a bid amount specifying the amount an advertiser 230 will pay the social networking system 100 for presenting the identified content. The social networking system 100 may provide advertisers 230 with a web interface for providing ad requests to the social networking system 100. Hence, the web interface allows an advertiser 230 to easily specify the relevant information for an ad request, including the bid amount.

Figure 8:
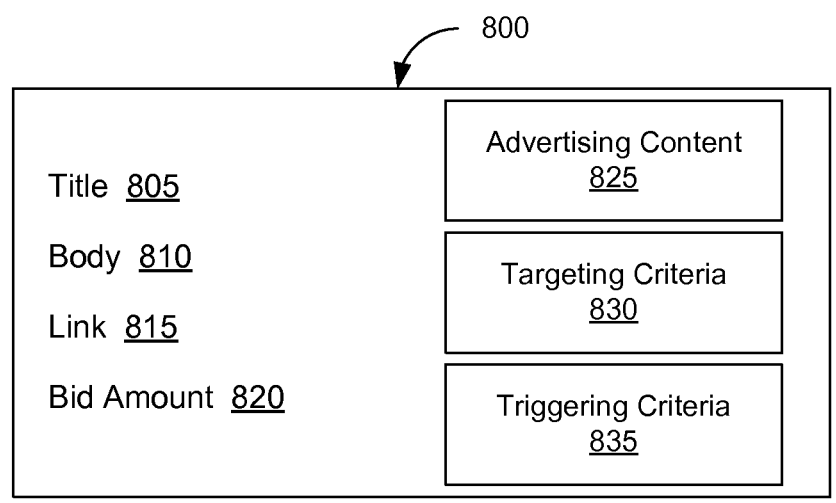
FIG. 8 is a diagram of an ad request, in accordance with an embodiment of the invention.

FIG. 8 illustrates components of an ad request 800 provided to the social networking system 100 by an advertiser 230. In one embodiment, the social networking system 100 stores the ad request 800 in an ad request database 125. In the example shown by FIG. 8, the ad request 800 comprises a title field 805, a body field 810, a link field 815, a bid amount field 820, advertising content 825, targeting criteria 830, and triggering criteria 835.

The title field 805 and body field 810 may be used by the social networking system 100 to present a sponsored story. For example, the ad request may include the title field 805 as a header for the sponsored story and include the body 810 as the textual story for the sponsored story. For example, the body field 810 may specify: "[User.Name] has purchased tickets for [Event.Name]." The resulting sponsored story would contain this text, with the names of the user and event objects associated with the action that the sponsored story is describing inserted into the text as indicated.

In an embodiment, data in the link field 815 may also be added to the content of the sponsored story, for example, for providing the call to action of the ad. The ad request 800 may also include additional advertising content 825 to be appended to the sponsored story. This content 825 may include any type of media content suitable for presentation on a web page, including pictures, video, audio, hyperlinks, and any other suitable content.

The bid amount field 820 of the ad request 800 may indicate an amount of money that the advertiser 230 pays the social networking system 100 each time a user presented with the sponsored story clicks on it. Alternatively, the bid amount field 820 specifies an amount the advertiser 230 pays each time the sponsored story is displayed to a user or a certain number of users. In other embodiments, the bid amount field 820 has any suitable format for representing the compensation received by the social networking system 100 if the content identified by the ad request is presented to a social networking system user or interacted with by a social networking system user.

Additionally, the ad request 800 may allow the advertiser 230 to specify targeting criteria 830 used to determine which users may receive an ad request. These targeting criteria 830 may include filters to apply to fields of a user's user profile or other objects maintained by the social networking system 100, and/or they may include free form text.

The ad request 800 also allows the advertiser 230 to specify triggering criteria 835 specifying conditions under which the ad request is used to created a sponsored story. Triggering criteria 835 may specify one or more other users of the social networking system who are connected to the viewing user, one or more objects of the social networking system, one or more and actions taken by a user with respect to objects, For example, the triggering criteria 835 is compared to the content of organic stories, and a sponsored story is created for the viewing user when an organic story satisfies one or more triggering criteria 835.

Social Networking System Architecture

Figure 3:
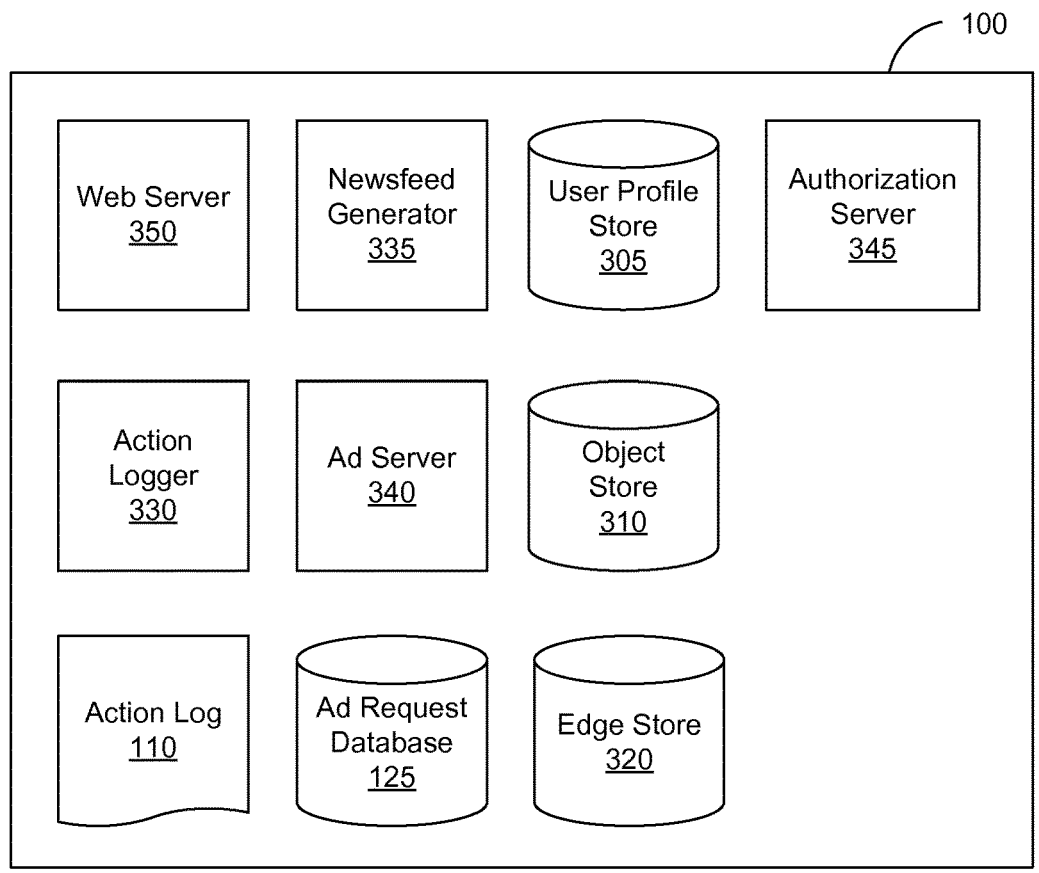
FIG. 3 is a block diagram of a social networking system, in accordance with an embodiment of the invention.

FIG. 3 is a diagram of one embodiment of a social networking system 100. The embodiment of a social networking system 100 shown by FIG. 3 includes a user profile store 305, an object store 310, an edge store 320, an action logger 330, an action log 110, a newsfeed generator 335, an ad server 340, an ad request database 125, an authorization server 345 and a web server 350. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

Each user of the social networking system 100 is associated with a user profile, which is stored in the user profile store 305. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 305 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. Further examples include anything a user can add, upload, send, or "post," to the social networking system 100. For example, a user communicates posts to the social networking system 100 from a user device 210. Posts may include data such as status updates or other textual data, location information, photos, videos, links, music or other similar data and/or media and are associated with the user profile of the posting user. A user profile in the user profile store 305 may also maintain references to actions by the corresponding user performed on content items in the content store 310 and stored in the action log 320.

The social networking system 100 maintains data about a number of different types of objects 105 with which a social networking system user may interact. The object store 310 stores a data structure including data for each object maintained by the social networking system 100. The data structures comprise information fields that may be different depending upon the type of the object. For example, for event type objects, the object store 310 includes data structures specifying the time and location for an event. When a new object of a particular type is created, the social networking system 100 initializes a new data structure of the corresponding type, assigns a unique object identifier to it, and adds data to the data structure as needed. Fr example, if a user defines a new event the social networking system 100 generates a new instance of an event in the object store 310, assigns a unique identifier to the event, and populates the fields of the event with information provided by the user.

Examples of information contained within objects include major life events such as graduation, marriage, or the birth of a child, as well as other events such as changes in user location, check-ins, comments on other items in the social networking system, tags to photos and other day to day occurrences. Objects also include information not directly related to particular users. For example, an object may describe Paris, France and may have a picture of the Eiffel Tower uploaded by a user. These are just a few examples of the information that makes up the objects of a social networking system, and many others are possible.

Objects may also be associated with metadata in order to ease of use of the objects by the social networking system 100. Metadata may also be included as tags in objects to link objects together based on similarity of content. In one embodiment, metadata comprises text descriptors for nouns, for example actual things, ideas, or concepts that have meaning. For example, "Inspector Gadget," "rowing," "sociology," and "comedy" are examples of metadata. In some embodiments, each object in the object store 310 is associated with one or more items of metadata. For example, if an object discussed the city of Santa Cruz, Calif., it may include metadata items for UCSC, surfing, California, ocean, beach, etc. Multiple objects may share metadata with each other, allowing a viewing user to easily transition between related objects using the metadata.

In one embodiment, an edge store 330 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 330 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 330, in one embodiment. In some embodiments, connections between users may be stored in the user profile store 310, or the user profile store 310 may access the edge store 330 to determine connections between users.

The social networking system 100 further stores data describing one or more connections between different users in an edge store 320. The connection information may indicate users who have similar or common work experience, group memberships, hobbies, educational history, or are in any way related or share common attributes. Additionally, the edge store 320 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The edge store 320 includes data structures describing a user's connections to other users and/or connections to objects. The edge store 320 may also associate a connection type with a user's connections, which may be used in conjunction with the user's privacy setting, to regulate access to information about the user. In addition, the edge store 320 may be accessed by other aspects of the social networking system 100.

Social information maintained by the social networking system 100 may be thought of in terms of a "social graph," which includes a plurality of nodes that are interconnected by a plurality of edges. Each node in the social graph may represent something that can act on and/or be acted upon by another node. Common examples of nodes include users, user profiles, non-person entities, content, objects, groups, events, messages, categories, concepts, and any other thing that can be represented by the social networking system. An edge between two nodes in the social graph represents a particular kind of connection between the two nodes, which may result from an action that was performed by one of the nodes on the other node.

The action logger 330 communications about user actions on and/or off the social networking system 100, populating the action log 320 with information about user actions. Such actions may include, for example, adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in the action log 320.

Users may interact with various objects on the social networking system 100, including commenting on posts, sharing links, and checking-in to physical locations via a mobile device, accessing content items in a sequence or other interactions. Information describing these actions is stored in the action log 320. Additional examples of interactions with objects on the social networking system 100 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 100 as well as other applications operating on the social networking system 100.

The action log 320 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

Data stored in the action log 110, ad request database 125, the user profile store 305, object store 310 and the edge store 320 allows the social networking system 100 to generate a social graph that uses nodes to identify various information items and edges connecting nodes to identify relationships between different items of information. An edge between two nodes in the social graph represents a particular kind of connection between the two nodes, which may result from an action that was performed by one of the nodes on the other node.

The newsfeed generator 335 generates communications for each user about information that may be relevant to the user. These communications may take the form of organically generated stories (organic stories), each where story is an information message comprising one or a few lines of information about an action in the action log 110 that is relevant to the particular user. These communications may also take the form of sponsored stories which include information about a product, and which may or may not include information about how the product is relevant to the particular user based on an action in the action log 110. The stories are presented to a user via one or more pages of the social networking system 100, for example in each user's home page or newsfeed page. The operation of the newsfeed generator 335 is described in more detail below in connection with FIG. 6.

The ad server 340 is configured to provide information regarding sponsored stories to the newsfeed generator 335 from the ad request database 125 and the action log 110. The ad server also manages interactions between advertisers 230 and the social networking system 100. For example, the ad server 340 manages the bidding process by advertisers 230 for sponsored stories provided to users of the social networking system. In one embodiment, the ad server 340 determines the revenue contribution for sponsored stories based on the bid amount identified by ad requests associated with the sponsored stories. The ad server 340 may determine an expected value to the social networking system 100 of a sponsored story and use the expected value to determine the revenue contribution. For example, an expected value for a sponsored story is determined by multiplying a bid amount associated with the sponsored story by an advertiser by a probability that a user will access the sponsored story. As another example, the bid amount is the expected value. Using the expected value to determine the revenue contribution allows the ad server 340 to identify the amount the social networking system receives if a sponsored story is displayed. Operation of the ad server 340 is described in more detail below in connection with FIG. 6.

The authorization server 345 enforces one or more privacy settings of the users of the social networking system 100. A privacy setting of a user determines how particular information associated with a user can be shared. In one embodiment, a privacy setting includes a specification of particular information associated with a user and a specification of the entity or entities with whom the information specified information may be shared. Examples of entities with which information can be shared may include other users, applications, advertisers, external websites or any entity that can potentially access the information. The information that can be shared by a user comprises user profile information like profile photo, phone numbers associated with the user, user's connections, actions taken by the user such as adding a connection, changing user profile information and the like.

The web server 350 links the social networking system 100 via the network 220 to the one or more user devices 210, as well as to the one or more third party websites 130 and/or advertisers 230. The web server 350 serves web pages, as well as other web-related content, such as Java, Flash, XML and so forth. The web server 350 may provide the functionality of receiving and routing messages between the social networking system 100 and the user device 210, for example, instant messages, queued messages (e.g., email), text and SMS (short message service) messages, or messages sent using any other suitable messaging technique. A user may send a request to the web server 350 to upload information, for example, images or videos that are stored in the object store 310. Additionally, the web server 350 may provide API functionality to send data directly to native client device operating systems, such as iOS®, ANDROID™, webOS® or RIM.

Publishing Organic Stories and Sponsored Stories to Users

Figure 4:
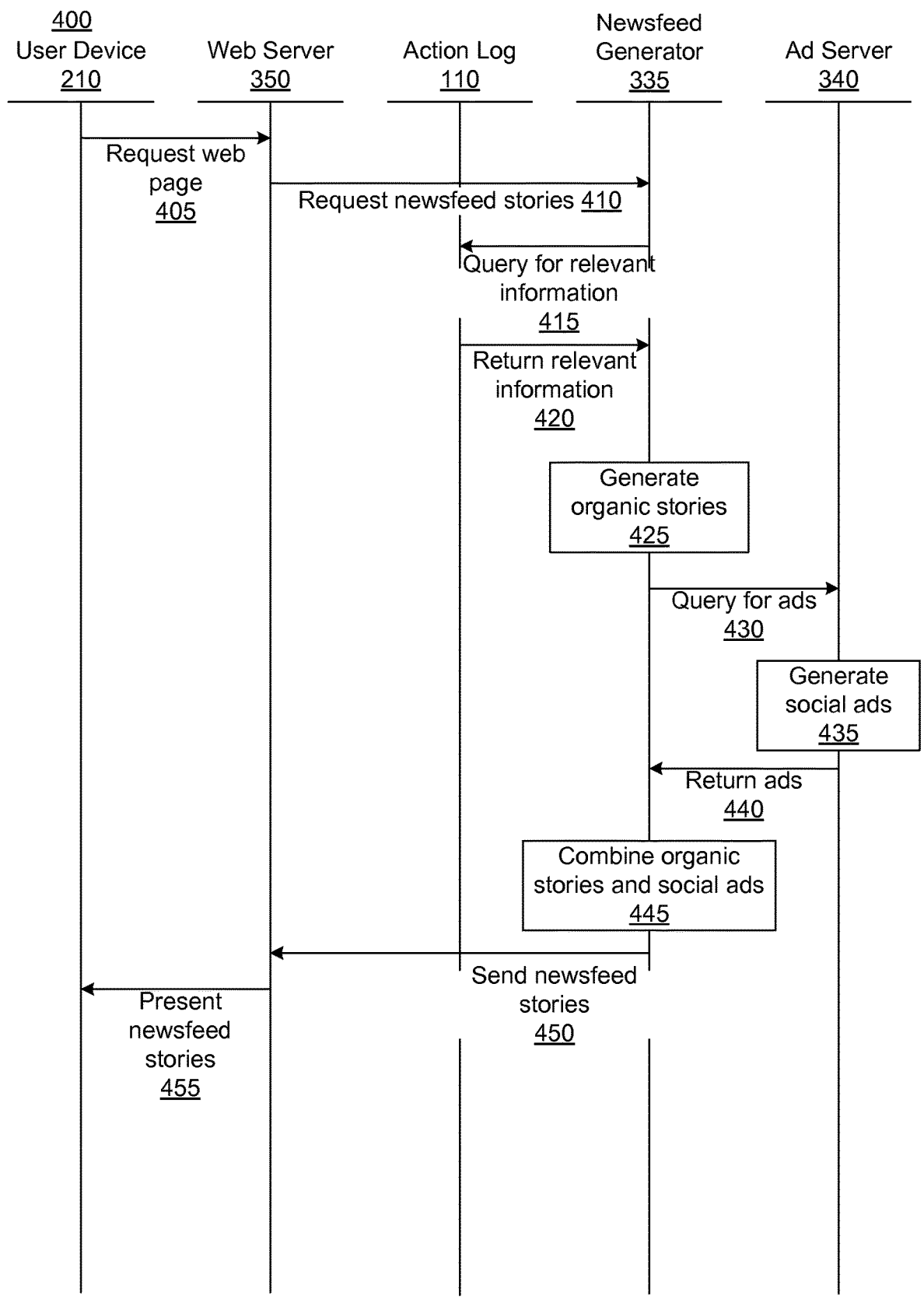
FIG. 4 illustrates a process for combining organic stories and sponsored stories for inclusion in a newsfeed in accordance with one embodiment of the invention.

FIG. 4 illustrates a process 400 for combining organic stories and sponsored stories for presentation to social networking system users in accordance with one embodiment of the invention. The social networking system 100 may use the process 400, for example, to publish a newsfeed to a viewing user including stories describing actions of other users with whom the viewing user is connected. Stories in such a newsfeed include both organic stories and sponsored stories. The newsfeed may be displayed to the viewing user on the viewing user's home page or user profile. For purposes of illustration, the process in FIG. 4 is described in a newsfeed context however, in other embodiments the generated stories may be presented to users in other ways, for example on third party websites or in banner advertisements.

To publish newsfeed stories to a website, a user requests 405 content, such as a web page, from the social networking system 100 via a user device 210. The requested content may be an initial web page presented when a user logs into the social networking system 100 or other content displayed by the social networking system 100 in response to received user requests for content. In response to receiving the request, the web server 350 of the social networking system 100 requests 410 newsfeed stories from the newsfeed generator 335. The request for stories requests both organic stories and sponsored stories, as both of these may be presented in the same interface by the social networking system. In one embodiment, the web server 320 may separately request 410 organic stories and sponsored stories.

In response to the request for stories, the newsfeed generator 335 queries 415 the action log 110 for actions relevant to the viewing user, and actions relevant to the viewing user are returned 420 to the newsfeed generator 335. In one embodiment, the returned actions are selected based on the affinity of the viewing user for one or more of a user performing an action, the action and/or the object on which the action was performed. Using affinity score allows the action log to return actions that are most likely to be of interest to the viewing user. From the returned actions, the newsfeed generator 335 generates 425 organic stories identifying actions, users performing actions and objects upon which the actions were performed. Generation of organic stories is further described below in connection with FIG. 5.

In addition to generating 425 organic stories, the newsfeed generator 335 queries 430 the ad server 340 for sponsored stories. The ad server 340 generates 435 sponsored stories and returns 440 them to the newsfeed generator 335. Generation of sponsored stories is described in more detail in connection with FIG. 6.

The newsfeed generator 335 then combines 445 the organic stories and the sponsored stories into a single ranking where the organic stories and sponsored stories are ranked based on a common unit of measurement. In one embodiment, the ranking is generated by applying a conversion factor to the sponsored stories to convert the scores of the sponsored stories to total scores having the same unit of measurement as organic story scores. Combining organic stories and sponsored stories into a single ranking is described in more detail in connection with FIG. 7. Stories for a newsfeed are selected from the ranking and sent 450 from the newsfeed generator 335 to the web server 305, which presents 455 the selected stories to the viewing user. For example, the web server 350 incorporates the newsfeed stories into a web page displayed to the viewing user.

Generation of Organic Stories

Figure 5:
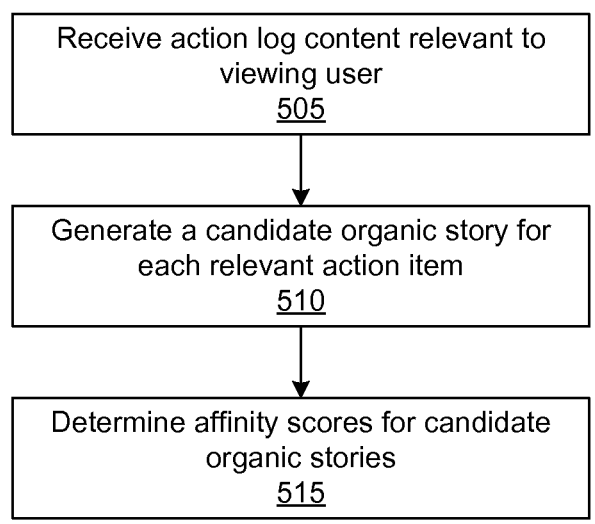
FIG. 5 is a flow chart of a process for generating organic stories, in accordance with an embodiment of the invention.

FIG. 5 is a flow chart of one embodiment of process for generating 425 organic stories. In one embodiment, the organic stories are generated responsive to a newsfeed generator 335 receiving a request for newsfeed stories from a web server 350 of the social networking system 100 and querying an action log 110 for information relevant to the viewing user.

In one embodiment, data stored by the social networking system associated with the viewing user is used to identify information from the action log 110 relevant to the viewing user. For example, one or more of preferences, interests, and original content stored in the user profile store 305 for the viewing user, the viewing user's connections to other users or objects as stored in the edge store 320, and the preferences, interests, and original content of those other users and objects stored in the user profile store 305 and object store 310 are used to select data from the action log 110. Other rules or criteria may also be defined and used to determine entries in the action log 110 relevant to the viewing user. Determination of whether an entry in the action log is relevant to the viewing user need not, and generally should not, affect the determination of whether the entry is relevant for another user.

The newsfeed generator 335 receives 505 the entries from the action log 315 determined to be relevant to the viewing user and generates 510 a newsfeed story describing each of the received action log entries. The organic stories may contain varying information, depending on the type of action in an entry.

Because website screen real estate is limited and because there could be hundreds, potentially thousands, of organic stories that could displayed for a viewing user at any given time, the newsfeed generator 335 will ultimately generally select only a subset of the possible organic stories for display to the viewing user. Preferably, the newsfeed generator 335 selects the organic stories that would be most relevant to the viewing user.

To determine which organic stories for presentation to the viewing user, the newsfeed generator determines 515 an affinity score for each of the organic stories. In the context of the social networking system 100, the viewing user may have affinities for other users, other objects, types of actions, types of objects, and content. The affinity of the viewing user for another item in the social networking system 100 indicates the viewing user's likely interest in the item. Accordingly, the affinity score may be based on a weighted function that accounts for the set of affinities of the viewing user for each type of data field included in an organic story. The social networking system 100 may obtain a user's affinities based on the viewing user's express interests (whether provided directly or indirectly, for example, through communications with other users) and/or implicitly based on the viewing user's actions (e.g., a user's checking of another user's page indicates an interest in that other user, or clicking on particular types of links may indicate an interest in similar links). An affinity, as measured for example by an affinity score, need not be an actual subjective interest or lack of interest that a user has for something (i.e., the user likes punk rock music, and dislikes vegetarian restaurants). Rather, an affinity expresses a correlation between data in the organic story and some information stored by the social networking system 100 in connection with the viewing user, whether it is an action taken by the viewing user, a communication involving the viewing user, or a characteristic, feature or expressed interest in the viewing user's profile.

For example, if the viewing user has a high affinity score for John Smith or Bob Roberts and for being invited to events, an organic story where John Smith and Bob Roberts had posted to each other's user profiles regarding invitations and RSVPs to an upcoming party would have a relatively high affinity score for the viewing user.

Generation of Sponsored Stories

Figure 6:
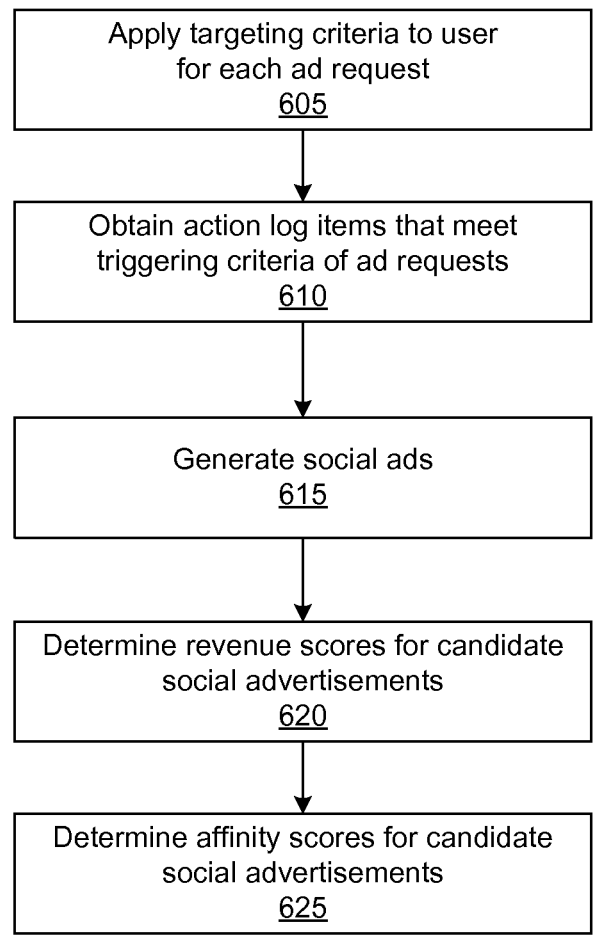
FIG. 6 is a flow chart of a process for generating sponsored stories, in accordance with an embodiment of the invention.

FIG. 6 illustrates one embodiment of process for generating 435 sponsored stories. To generate sponsored stories, the ad server 340 applies 605 targeting and/or triggering criteria of the ad requests included in the ad request database 125 to data stored by the social networking system 100 and associated with the viewing user. As described above, ad requests may specify a set of criteria so that a sponsored story is presented to users matching the criteria and not to users that do not match the criteria. For example, targeting criteria may specify that a sponsored story is to be presented to users between the ages of 18 and 30 and having an interest in music in their user profile. As another example, triggering criteria included in an ad request specifies that a sponsored story is to be presented to a viewing user if one of their friends in the social network performed a specified action and/or performed an action on a specified object. Hence, triggering criteria may be applied 605 to data used to generate organic stories, or to generated organic stories, to identify content for inclusion in a sponsored story.

To determine whether a targeting criteria of an ad request is matched, the social networking system 100 may make use of the preferences, interests, actions, and original content stored in the user profile store 305 for the viewing user, the viewing user's connections to other users or objects as stored in the edge store 320, and the preferences, interests, actions and original content of those other users and objects stored in the user profile store 305 and object store 310, respectively. Various other rules may be defined for determining whether targeting criteria of ad requests match the particular user, depending on the goal and purpose of the system.

To determine whether a triggering criteria of an ad request is met, the ad server obtains 610 entries from the action log 110 that match one or more triggering criteria of ad requests in the identified subset. Ad requests may specify triggering criteria specifying conditions to be satisfied before a sponsored story is created. The triggering criteria may be met in various ways. For example, if an entry in the action log 110 matches a triggering criteria, or if the entry mentions an object or user that matches a triggering criteria. For example, to promote a concert for a new band, an ad request may include triggering criteria that a sponsored story is generated responsive to an entry in the action log including a concert event object. Accordingly, if an entry in the action log indicates that a user connected to the viewing user joins the concert event to their user profile, the ad server 340 obtains 610 the entry from the log 110 for use in a sponsored story.

Entries from the action log 110 satisfying one or more of the triggering criteria from the subset of ad requests having targeting criteria satisfied by the viewing user include content used by the ad server 340 to generate 615 sponsored stories. A variety of data may be included in a sponsored story, such as information from the actions and/or objects from the action log 110, information from the ad request, information from the viewing user's profile and/or connections or other suitable information. Hence, the content of the sponsored story is individually tailored to the viewing user that is presented the sponsored story.

The ad server 340 also determines 620 a revenue contribution and determines 625 an affinity score (or "organic contribution") for the generated sponsored stories. The revenue contribution and organic contribution are used to determine a score used for identifying sponsored stories for inclusion in a newsfeed. In one embodiment, the revenue contribution is determined from the expected value to the social networking system 100 from presenting the sponsored story. For example, the ad server determines an expected value for a sponsored story by multiplying a bid amount associated with the sponsored story by an advertiser by a probability that the viewing user will access the sponsored story. In one embodiment, the probability that the viewing user will access the sponsored story is determined as a weighted function of the viewing user's affinities for the objects, users and/or actions in the entry from the action log 110 triggering generation of the sponsored story. In one embodiment, the user's affinities used are determined in the same way an affinity score is determined for an organic story as described above. In another embodiment, the revenue contribution is determined 620 from an expected value derived from the bid price of the ad request corresponding to the sponsored story using cost-per-impression (CPI), cost-per-click (CPC) or other suitable advertising model.

The affinity score, or organic contribution, for the sponsored story is determined 625 in a similar manner as for an organic story, as described above. The affinity score and the revenue contribution are used to obtain a score for each of the sponsored stories.

Combining Organic Stories and Sponsored Stories Using a Conversion Factor

Figure 7:
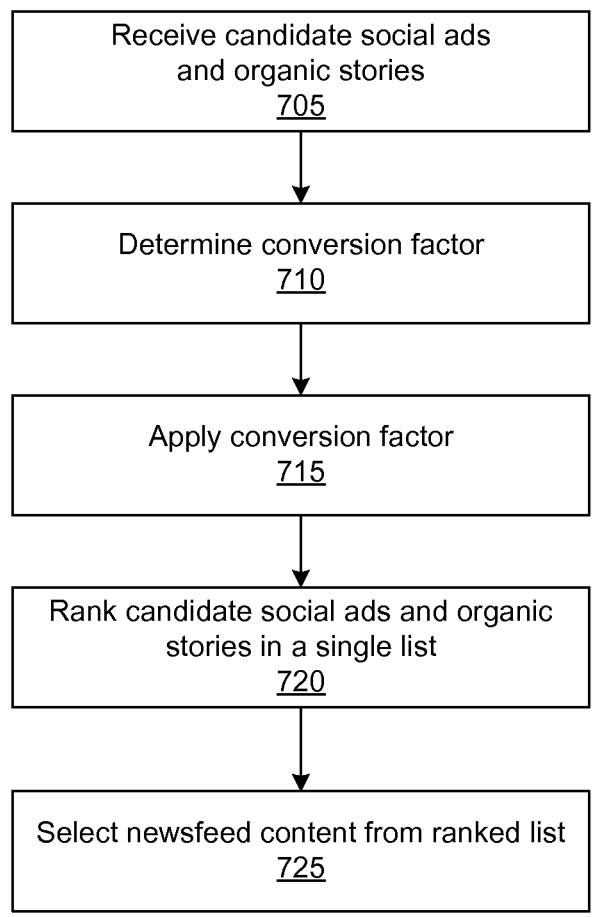
FIG. 7 is a flow chart of a process for combining organic stories and sponsored stories to publish in a newsfeed, in accordance with an embodiment of the invention.

FIG. 7 is a flow chart of one embodiment of a process for combining 445 organic stories and sponsored stories to select content for a newsfeed. The newsfeed generator 335 receives 705 candidate sponsored stories and candidate organic stories. In one embodiment, the candidate sponsored stories are received 705 from the ad server 340 and the candidate organic stories are generated by the newsfeed generator 335 from data received from the action log 110. In another embodiment, the candidate sponsored stories and the candidate organic stories are generated by the newsfeed generator 335. However, the candidate organic stories are associated with an organic story score representing the affinity of a viewing user for the different organic stories while the candidate sponsored stories are associated with scores based on both the revenue contribution and affinity score, or organic contribution, of the sponsored story. Hence, the value of the organic stories and of the sponsored stories are expressed in different units of measurement.

To simplify selection of content for the newsfeed, the newsfeed generator 335 converts the organic story scores and the scores into a common unit of measurement. This allows the sponsored stories and the organic stories to be included in a unified ranking from which content is selected. In one embodiment, the newsfeed generator 335 applies a conversion factor to one or more of the organic story scores and the scores of the sponsored stories to establish a common unit of measurement. For example, the newsfeed generator 335 applies the conversion factor to the scores of the sponsored stories to generate total scores for the sponsored stories, where the total scores have the same unit of measurement as the organic story scores. In this example, the conversion factor specifies the relative importance of the revenue contribution and the affinity score to the total score of the sponsored story, allowing the revenue contribution and the affinity score to be combined. This allows the newsfeed generator to select organic stories and sponsored stories based on their organic story scores and total scores, respectively.

In one embodiment, the magnitude of the conversion factor affects the likelihood that a total score of a sponsored story exceeds the organic story score of an organic story, affecting whether the sponsored story is included in the newsfeed. For example, a conversion factor with a larger magnitude makes it more likely that sponsored stories are included in the newsfeed, while a conversion factor with a lower magnitude makes it more likely that organic stories are included in the newsfeed. Thus, by modifying the conversion factor, the social networking system 100 may modify the amount of sponsored stories or organic stories included in the newsfeed.

In different embodiments, the newsfeed generator 335 determines 710 the conversion factor in different ways. For example, the conversion factor is fixed or predetermined. Alternatively, the conversion factor is dynamically determined. Dynamic determination of the conversion factor may be based on one or more factors that may be changed. For example, the magnitude of the conversion factor may be increased to include a greater number of sponsored stories in the newsfeed, increasing revenue to the social networking system 100. As another example, the magnitude of the conversion factor may be decreased so that fewer sponsored stories appear in the newsfeed, possibly increasing revenue to the social networking system 100 over time by causing users to interact with the social networking system more frequently because of the dearth of advertising content.

The conversion factor may also be dynamically determined 710 for individual users. In one embodiment, the conversion factor is dynamically adjusted to control the proportion of the newsfeed for a viewing user that is filled with sponsored stories or organic stories. For example, the conversion factor may be dynamically adjusted so that a specified percentage of the newsfeed, such as 5% to 10%, includes sponsored stories, while the remaining percentage includes with organic stories. The proportion of sponsored stories to organic stories may be determined with respect to a period of time or with respect to a number of stories included in the newsfeed stories. For example, the proportion of sponsored stories to organic stories may be determined based on newsfeed stories over the previous hour, day, week, or month of published newsfeed stories, and/or based on the last 5, 10, or 100 newsfeed stories published or viewed by the viewing user.

As sponsored stories and organic stories are included in the newsfeed, the system 100 tracks the percentage of the newsfeed comprising sponsored stories. If the percentage approaches a threshold value, the social networking system 100 modifies the magnitude of the conversion factor to keep the percentage of the newsfeed that is sponsored stories within the designated range. For example, as the newsfeed approaches 10% sponsored stories, the magnitude of the conversion factor is decreased to reduce the likelihood that subsequent sponsored stories are included in the newsfeed.

To determine content for the newsfeed, the conversion factor is applied 715 to the scores and/or to the organic story stores, so that a common unit of measurement is used for both the sponsored stories and for the organic stories. In one embodiment, the conversion factor is applied 715 to the scores of the sponsored stories to generate total scores having the same unit of measurement as the scores. The conversion factor may be applied differently depending upon the implementation.

In one implementation, the conversion factor is a multiplicative factor applied to the revenue contribution of a sponsored story that converts and/or scales the revenue contribution into a value that can be combined with the affinity score, or organic contribution, of the sponsored story. For example, the total score (T) for a sponsored story is the sum of the organic contribution (AS) and the revenue contribution (RS) multiplied by the conversion factor (CF). Expressed as a formula this equates to: $T=AS+(CF)RS$. Hence, in this example, the conversion factor converts the revenue contribution into the same units as the affinity score.

In another implementation, the conversion factor is a multiplicative factor applied to the affinity scores of both a sponsored story and to an organic story score. For example, for a sponsored story the function $T=(CF)AS+RS$ may be used, where CF is the conversion factor, AS is the organic contribution of the sponsored story and RS is the revenue contribution for the sponsored story; for organic stories, the function $AS'=(CF)AS$, where AS is the organic story score and CF is the conversion factor. In this example, the conversion factor converts affinity scores into the same units as the revenue contribution. In other implementations, more than one conversion factor may be used. For example, conversion factors may be coefficients of a polynomial function used by the social networking system 100 to achieve a desired or specified relationship between the organic contributions, organic story scores, revenue contributions, and the conversion factors.

After application of the conversion factor to establish a common unit of measurement for organic stories and sponsored stories, the candidate sponsored stories and candidate organic stories are ranked in a single list. The candidate sponsored stories are ranked 720 based on their total scores, and the organic stories are ranked based on their organic story score. The newsfeed generator 335 then selects 725 content for the newsfeed from the ranked list. For example, the newsfeed generator 335 selects a subset of content having the relative maximum values from the list.

Combining organic stories and sponsored stories in a single newsfeed presented to the viewing user results in little or no differentiation between advertising and general information of interest to the viewing user. Because social networking systems 100 allow their users to keep up to date on what other users are doing, presenting sponsored stories along with organic stories, which describe user activities, increases the likelihood that users will view and/or interact with the sponsored stories. Further, combining organic stories and sponsored stories makes it difficult for a viewing user to distinguish whether a newsfeed story is an organic story or a sponsored story. In fact, the content of a sponsored story may actually show up as an organic story in some cases.

Hence, by paying for the sponsored story, an advertiser is effectively increasing the likelihood that an organic story is published to a viewing user in a situation where it might not otherwise be selected for publication. For example, paying for a sponsored story allows an advertiser to increase the probability the sponsored story will be published to users connected to the user taking the action used to generate the sponsored story. While the sponsored story may also include additional advertisement content in addition to the description of the action, the sponsored story informs users of actions taken by other social networking system users.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network website, it will apparent to one of ordinary skill in the art that the invention may be used with any electronic social network service, even if it is not provided through a website. Any computer-based system that provides social networking functionality can be used in accordance with the present invention even if it relies, for example, on e-mail, instant messaging, or other form of electronic communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible, non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by one or more processors, a request to sponsor organic stories, the request comprising a bid amount and specifying criteria identifying one or more organic stories to be sponsored;
   accessing, by the one or more processors, a plurality of candidate organic stories for a viewing user, each organic story identifying a social networking system user connected to the viewing user, one or more actions performed by the social networking system user, and one or more objects of the one or more actions;
   determining, by the one or more processors, that at least one of the candidate organic stories matches the specified criteria in the request;
   generating, by the one or more processors, a sponsored score for each matching candidate organic story, generating the score comprising:
      computing, by the one or more processors, an organic contribution based on an affinity of the viewing user for one or more of the social networking system user, an action, or an object identified by the candidate organic story,
      computing, by the one or more processors, a revenue contribution based on the bid amount of the request,
      combining, by the one or more processors, the organic contribution and the revenue contribution to generate the sponsored score, and
      applying, by the one or more processors, a conversion factor to the score to allow the matching candidate organic story to be ranked for selection alongside other candidate organic stories having scores that are computed differently than for the matching candidate organic stories;
   computing, by the one or more processors, an organic score for each candidate organic story not matching the specified criteria in the request;
   ranking, by the one or more processors, the matching candidate organic stories and the candidate organic stories not matching the specified criteria together to form a unified list of candidate organic stories based on the sponsored scores and the organic scores;
   selecting, by the one or more processors, one or more of the candidate organic stories on the ranked unified list for presentation to the viewing user based on the ranking;
   organizing, by the one or more processors, a user interface to include the selected one or more candidate organic stories, where the selected one or more candidate organic stories are ordered within a limited display space in the user interface according to the ranking; and
   sending, by the one or more processors, the user interface to a user device configured to display the user interface to the viewing user.

2. The method of claim 1, wherein the specified criteria comprises at least one from a group consisting of: one or more other social networking system users connected to the viewing user, one or more actions performed by the social networking system user, and one or more objects of the one or more actions, or wherein matching organic stories to the criteria comprises determining that the criteria matches the organic story.

3. The method of claim 1, wherein selecting one or more of the candidate organic stories on the ranked unified list for presentation to the viewing user based on the ranking comprises:
   selecting a number of candidate organic stories matching criteria in the request; and
   selecting a number of candidate organic stories not matching criteria in the request based on a specified proportion between the number of candidate organic stories matching criteria in the request and the number of candidate organic stories not matching criteria in the request.

4. The method of claim 1, wherein the request further comprises targeting criteria comprising one or more user characteristics of social networking system users, and wherein a candidate organic story matching criteria in the request is selected responsive to the viewing user satisfying one or more of the targeting criteria included in the request including the criteria matched by the candidate organic story.

5. The method of claim 1, wherein the affinity of the viewing user for one or more of the social networking system user, an action, or an object identified by the candidate organic story is based on a user profile of the viewing user, the user profile including at least one of preferences, interests, original content of the viewing user, one or more connections between the viewing user and other users of the social networking system, one or more connections between the viewing user and other objects stored in the social networking system, and one or more user profiles of the other users connected to the viewing user through the social networking system.

6. A method comprising:
   receiving, by one or more processors, a request for content from a viewing user of a social networking system;
   determining, by the one or more processors, a plurality of candidate stories for the viewing user, each candidate story identifying a social networking system user connected to the viewing user, one or more actions performed by the social networking system user and one or more objects of the one or more actions;

matching, by the one or more processors, one or more of the candidate stories to a request, the request comprising a bid amount and specifying criteria identifying one or more organic stories to be sponsored, where the one or more matching candidate stories are sponsored stories and one or more non-matching candidate stories are organic stories;

generating, by the one or more processors, an organic story score for each organic story, the organic story score for an organic story based on an affinity of the viewing user for one or more of the social networking system user, an action, or an object identified by an organic story;

generating, by the one or more processors, a sponsored story score for each sponsored story, the sponsored story score comprising a revenue contribution based on the bid amount and an organic contribution based on an affinity of the viewing user for one or more of the social networking system user, an action, or an object identified by the sponsored story;

ranking, by the one or more processors, the sponsored stories and the organic stories together to form a unified list of stories, the sponsored stories ranked according to their sponsored story score and the organic stories ranked according to their organic story score;

selecting, by the one or more processors, one or more sponsored stories and organic stories on the ranked unified list of stories for presentation to the viewing user based on the ranking;

organizing, by the one or more processors, a user interface to include the selected one or more sponsored stories and organic stories, wherein the selected one or more sponsored stories and organic stories are ordered within a limited display space in the user interface according to the ranking; and sending, by the one or more processors, the user interface to a user device configured to display the user interface to the viewing user.

7. The method of claim 6, wherein generating the sponsored story score for each sponsored story comprises:

applying a conversion factor to one or more of the revenue contribution and the organic contribution, application of the conversion factor converting the sponsored story score to a common unit of measurement as the organic story score.

8. The method of claim 7, wherein the conversion factor is predetermined.

9. The method of claim 7, wherein the conversion factor is dynamically determined.

10. The method of claim 9, wherein the dynamically determined conversion factor is determined for the viewing user.

11. The method of claim 7, where the conversion factor is dynamically adjusted to maintain a proportion between a number of organic stories sent to the viewing user and a number of sponsored stories sent to the viewing user.

12. The method of claim 7, where the conversion factor is dynamically adjusted to maintain a proportion between a number of organic stories displayed to a viewing user and a number of sponsored stories displayed to a viewing user within a range.

13. The method of claim 12, where the range comprises between 5% and 10% sponsored stories.

14. The method of claim 7, wherein the conversion factor is applied to the revenue contribution to generate a modified revenue contribution and the sponsored story score comprises a combination of the modified revenue contribution and the organic contribution.

15. The method of claim 7, wherein the conversion factor is adjustable, and wherein increasing a magnitude of the conversion factor increases a position of sponsored stories in the ranking.

16. The method of claim 7, wherein the conversion factor is adjustable, and wherein decreasing a magnitude of the conversion factor decreases a position of sponsored stories in the ranking.

17. The method of claim 6, wherein the affinity of the viewing user is based on a user profile of the viewing user, the user profile including at least one of preferences, interests, original content of the viewing user, one or more connections between the viewing user and other users of the social networking system, one or more connections between the viewing user and other objects stored in the social networking system, and one or more user profiles of the other users connected to the viewing user through the social networking system.

18. A method comprising:

storing in an action log of a social networking system data describing actions taken by a plurality of users of the social networking system on a plurality of objects stored in the social networking system;

storing a plurality of requests in a request database of the social networking system, each request including a bid amount and one or more triggering criteria;

receiving, by one or more processors, a request for content from a viewing user;

generating, by the one or more processors, one or more organic stories for the viewing user from data in the action log, each organic story identifying a social networking system user connected to the viewing user, one or more actions performed by the social networking system user and one or more objects of the one or more actions;

generating, by the one or more processors, an organic story score for each organic story, the organic story score based on an affinity of the viewing user for one or more of the social networking system user, an action, or an object identified by an organic story;

generating, by the one or more processors, one or more sponsored stories, each sponsored story based on one of the organic stories, sponsored stories differing from organic stories in that each sponsored story is associated with one of the plurality of requests;

generating, by the one or more processors, a score for each of the one or more sponsored stories, where the score for a sponsored story comprises a revenue contribution based on the bid amount and also comprises an organic contribution based on an affinity of the viewing user for one or more of the social networking system user, an action, or an object identified by the sponsored story;

determining, by the one or more processors, a common unit of measurement for the sponsored story scores and for the organic story scores;

ranking, by the one or more processors, the sponsored stories and the organic stories using the common unit of measurement to form a unified list of stories;

selecting, by the one or more processors, one or more sponsored stories and organic stories on the ranked unified list of stories for presentation to the viewing user based on the ranking;

organizing, by the one or more processors, a user interface to include the selected one or more sponsored stories and organic stories, wherein the selected one or more sponsored stories and organic stories are ordered within a limited display space in the user interface according to the ranking; and sending, by the one or more processors, the user interface to a user device configured to display to the viewing user.

19. The method of claim 18, wherein determining the common unit of measurement for the sponsored story scores and for the organic story scores comprises applying a conversion factor to the sponsored story scores to generate total scores having a common unit of measurement as the organic story scores.

20. The method of claim 19, wherein the conversion factor is dynamically determined for the viewing user.

21. The method of claim 19, where the conversion factor is dynamically adjusted to maintain a proportion between a number of organic stories sent to the viewing user and a number of sponsored stories sent to the viewing user.

22. The method of claim 19, where the conversion factor is dynamically adjusted to maintain a proportion between a number of organic stories displayed to a viewing user to a number of sponsored stories displayed to a viewing user within a range.

23. The method of claim 18, wherein determining the common unit of measurement for the sponsored story scores and for the organic story scores comprises applying a conversion factor to the organic story scores to generate modified organic scores having a common unit of measurement as the sponsored story scores.

24. The method of claim 18, wherein determining the common unit of measurement for the sponsored story scores and for the organic story scores comprises applying a conversion factor to the organic story scores and to the sponsored story scores.

25. The method of claim 18, wherein the triggering criteria identify one or more actions performed by one or more social networking system users with respect to one or more objects of the social networking system.

26. The method of claim 18, wherein at least one request of the plurality of requests further comprises targeting criteria comprising one or more user characteristics of social networking system users, and wherein a sponsored story associated with the request is generated based on the viewing user having one or more of the user characteristics of the associated request.

27. A system, comprising:
a processor;
a non-transitory memory including instructions, which when executed by the processor cause the processor to perform steps of:
receiving a request to sponsor organic stories, the request comprising a bid amount and specifying criteria identifying one or more organic stories to be sponsored;
accessing a plurality of candidate organic stories for a viewing user, each organic story identifying a social networking system user connected to the viewing user, one or more actions performed by the social networking system user and one or more objects of the one or more actions;
determining that at least one of the candidate organic stories matches the specified criteria in the request;
generating a sponsored score for each matching candidate organic story, generating the score comprising:

computing an organic contribution based on an affinity of the viewing user for one or more of the social networking system user, an action, or an object identified by the candidate organic story,
computing a revenue contribution based on the bid amount of the request,
combining the organic contribution and the revenue contribution to generate the sponsored score, and
applying a conversion factor to the score to allow the matching candidate organic story to be ranked for selection alongside other candidate organic stories having scores that are computed differently than for the matching candidate organic stories;
compute an organic score for each candidate organic story not matching the specified criteria in the request;
rank the matching candidate organic stories and the candidate organic stories not matching the specified criteria together to form a unified list of candidate organic stories based on the sponsored scores and the organic scores;
selecting one or more of the candidate organic stories on the ranked unified list for presentation to the viewing user based on the ranking;
organize a user interface to include the selected one or more candidate organic stories, where the selected one or more candidate organic stories are ordered within a limited display space in the user interface according to the ranking; and
sending the user interface to a user device configured to display the user interface to the viewing user.

28. A computer program product comprising a computer readable storage medium having instructions encoded thereon that, when executed by a processor, cause the processor to:
receive a request to sponsor organic stories, the request comprising a bid amount and specifying criteria identifying one or more organic stories to be sponsored;
access a plurality of candidate organic stories for a viewing user, each organic story identifying a social networking system user connected to the viewing user, one or more actions performed by the social networking system user and one or more objects of the one or more actions;
determine that at least one of the candidate organic stories matches the specified criteria in the request;
generate a sponsored score for each matching candidate organic story, where to generate the score, the instructions cause the processor to:
compute an organic contribution based on an affinity of the viewing user for one or more of the social networking system user, an action, or an object identified by the candidate organic story,
compute a revenue contribution based on the bid amount of the request,
combine the organic contribution and the revenue contribution to generate the sponsored score, and
apply a conversion factor to the score to allow the matching candidate organic story to be ranked for selection alongside other candidate organic stories having scores that are computed differently than for the matching candidate organic stories;
compute an organic score for each candidate organic story not matching the specified criteria in the request;
rank the matching candidate organic stories and the candidate organic stories not matching the specified criteria together to form a unified list of candidate organic stories based on the sponsored scores and the organic scores;
select one or more of the candidate organic stories on the ranked unified list for presentation to the viewing user based on the ranking;
organize a user interface to include the selected one or more candidate organic stories, where the selected one or more candidate organic stories are ordered within a limited display space in the user interface according to the ranking; and
send the user interface to a user device configured to display the user interface to the viewing user.

29. A system, comprising:
a processor;
a non-transitory memory including instructions, which when executed by the processor cause the processor to perform steps of:
receiving a request for content from a viewing user of a social networking system;
determining a plurality of candidate stories for the viewing user, each candidate story identifying a social networking system user connected to the viewing user, one or more actions performed by the social networking system user and one or more objects of the one or more actions;
matching one or more of the candidate stories to a request, the request comprising a bid amount and specifying criteria identifying one or more organic stories to be sponsored, where the one or more matching candidate stories are sponsored stories and one or more non-matching candidate stories are organic stories;
generating an organic story score for each organic story, the organic story score for an organic story based on an affinity of the viewing user for one or more of the social networking system user, an action, or an object identified by an organic story;
generating a sponsored story score for each sponsored story, the sponsored story score comprising a revenue contribution based on the bid amount and an organic contribution based on an affinity of the viewing user for one or more of the social networking system user, an action, or an object identified by the sponsored story;
ranking the sponsored stories and the organic stories together to form a unified list of stories, the sponsored stories ranked according to their sponsored story score and the organic stories ranked according to their organic story score;
selecting one or more sponsored stories and organic stories on the ranked unified list of stories for presentation to the viewing user based on the ranking;
organizing a user interface to include the selected one or more sponsored stories and organic stories, wherein the selected one or more sponsored stories and organic stories are ordered within a limited display space in the user interface according to the ranking; and
sending the user interface to a user device configured to display the user interface to the viewing user.

30. A computer program product comprising a non-transitory computer readable storage medium having instructions encoded thereon that, when executed by a processor, cause the processor to:
receive a request for content from a viewing user of a social networking system;
determine a plurality of candidate stories for the viewing user, each candidate story identifying a social networking system user connected to the viewing user, one or more actions performed by the social networking system user and one or more objects of the one or more actions;
match one or more of the candidate stories to a request, the request comprising a bid amount and specifying criteria identifying one or more organic stories to be sponsored, where the one or more matching candidate stories are sponsored stories and one or more non-matching candidate stories are organic stories;
generate an organic story score for each organic story, the organic story score for an organic story based on an affinity of the viewing user for one or more of the social networking system user, an action, or an object identified by an organic story;
generate a sponsored story score for each sponsored story, the sponsored story score comprising a revenue contribution based on the bid amount and an organic contribution based on an affinity of the viewing user for one or more of the social networking system user, an action, or an object identified by the sponsored story;
rank the sponsored stories and the organic stories together to form a unified list of stories, the sponsored stories ranked according to their sponsored story score and the organic stories ranked according to their organic story score;
select one or more sponsored stories and organic stories on the ranked unified list of stories for presentation to the viewing user based on the ranking;
organizing a user interface to include the selected one or more sponsored stories and organic stories, wherein the selected one or more sponsored stories and organic stories are ordered within a limited display space in the user interface according to the ranking; and
send the user interface to a user device configured to display the user interface to the viewing user.

31. A system, comprising:
a processor;
a non-transitory memory including instructions, which when executed by the processor cause the processor to perform steps of:
storing in an action log of a social networking system data describing actions taken by a plurality of users of the social networking system on a plurality of objects stored in the social networking system;
storing a plurality of requests in a request database of the social networking system, each request including a bid amount and one or more triggering criteria;
receiving a request for content from a viewing user;
generating one or more organic stories for the viewing user from data in the action log, each organic story identifying a social networking system user connected to the viewing user, one or more actions performed by the social networking system user and one or more objects of the one or more actions;
generating an organic story score for each organic story, the organic story score based on an affinity of the viewing user for one or more of the social networking system user, an action, or an object identified by an organic story;
generating one or more sponsored stories, each sponsored story based on one of the organic stories, sponsored stories differing from organic stories in that each sponsored story is associated with one of the plurality of requests;
generating a score for each of the one or more sponsored stories, where the score for a sponsored story comprises a revenue contribution based on the bid amount and also comprises an organic contribution based on an affinity of the viewing user for one or more of the social networking system user, an action, or an object identified by the sponsored story;

determining a common unit of measurement for the sponsored story scores and for the organic story scores;

ranking the sponsored stories and the organic stories using the common unit of measurement to form a unified list of stories;

selecting one or more sponsored stories and organic stories on the ranked unified list of stories for presentation to the viewing user based on the ranking;

organizing a user interface to include the selected one or more sponsored stories and organic stories, wherein the selected one or more sponsored stories and organic stories are ordered within a limited display space in the user interface according to the ranking; and sending the user interface to a user device configured to display the user interface to the viewing user.

32. A computer program product comprising a non-transitory computer readable storage medium having instructions encoded thereon that, when executed by a processor, cause the processor to:

store in an action log of a social networking system data describing actions taken by a plurality of users of the social networking system on a plurality of objects stored in the social networking system;

store a plurality of requests in a request database of the social networking system, each request including a bid amount and one or more triggering criteria;

receive a request for content from a viewing user;

generate one or more organic stories for the viewing user from data in the action log, each organic story identifying a social networking system user connected to the viewing user, one or more actions performed by the social networking system user and one or more objects of the one or more actions;

generate an organic story score for each organic story, the organic story score based on an affinity of the viewing user for one or more of the social networking system user, an action, or an object identified by an organic story;

generate one or more sponsored stories, each sponsored story based on one of the organic stories, sponsored stories differing from organic stories in that each sponsored story is associated with one of the plurality of requests;

generate a score for each of the one or more sponsored stories, where the score for a sponsored story comprises a revenue contribution based on the bid amount and also comprises an organic contribution based on an affinity of the viewing user for one or more of the social networking system user, an action, or an object identified by the sponsored story;

determine a common unit of measurement for the sponsored story scores and for the organic story scores;

rank the sponsored stories and the organic stories using the common unit of measurement to form a unified list of stories;

select one or more sponsored stories and organic stories on the ranked unified list of stories for presentation to the viewing user based on the ranking;

organizing a user interface to include the selected one or more sponsored stories and organic stories, wherein the selected one or more sponsored stories and organic stories are ordered within a limited display space in the user interface according to the ranking; and sending the user interface to a user device configured to display the user interface to the viewing user.

\* \* \* \* \*